(12) United States Patent  (10) Patent No.: US 7,641,995 B2
Ettwein et al.  (45) Date of Patent: Jan. 5, 2010

(54) HEAT EXCHANGER FOR A HEATING SYSTEM WITH INTEGRATED FUEL CELLS FOR THE PRODUCTION OF ELECTRICITY

(75) Inventors: Ralf Ettwein, Winterthur (CH); Alexander Schuler, Konstanz (DE)

(73) Assignee: Sulzer Hexis AG, Winterthur (CH)

( * ) Notice: Subject to any disclaimer, the term of this patent is extended or adjusted under 35 U.S.C. 154(b) by 649 days.

(21) Appl. No.: 10/938,082

(22) Filed: Sep. 10, 2004

(65) Prior Publication Data

US 2005/0118474 A1  Jun. 2, 2005

(30) Foreign Application Priority Data

Sep. 11, 2003 (EP) .................................. 03405666

(51) Int. Cl.
  *H01M 8/04* (2006.01)
  *F24H 3/00* (2006.01)
  *F28F 3/12* (2006.01)
(52) U.S. Cl. ............................. 429/26; 165/47; 165/168
(58) Field of Classification Search ................... 429/17, 429/20, 26; 165/47–57, 168
  See application file for complete search history.

(56) References Cited

U.S. PATENT DOCUMENTS

| | | | | |
|---|---|---|---|---|
| 6,042,956 | A * | 3/2000 | Lenel | 429/17 |
| 6,303,243 | B1 * | 10/2001 | Schuler | 429/17 |
| 2002/0194782 | A1 * | 12/2002 | Paisley | 48/197 FM |
| 2003/0049502 | A1 * | 3/2003 | Dickman et al. | 429/20 |

FOREIGN PATENT DOCUMENTS

| | | |
|---|---|---|
| EP | 0818840 A1 | 1/1998 |
| EP | 1193462 A2 | 4/2002 |
| JP | 10050327 | 2/1998 |
| JP | 2002098424 | 4/2002 |
| WO | WO 02/080295 A2 | 10/2002 |
| WO | WO 2080295 A2 * | 10/2002 |

\* cited by examiner

*Primary Examiner*—Patrick Ryan
*Assistant Examiner*—Muhammad Siddiquee
(74) *Attorney, Agent, or Firm*—Townsend and Townsend and Crew, LLP

(57) ABSTRACT

Please substitute the following version of the Abstract, with changes shown by strikethrough (for deletions) or underlining (for added matter). The heat exchanger (I) is provided for a heating system with integrated fuel cells (Z) for the production of electricity and with an additional burner (B). Electrical and thermal energy (E, Q) can be produced in this heating system from a gaseous fuel or from a fuel brought into the gas form by means of the fuel cells, and/or thermal energy (Q) can be produced by means of the additional burner. One part of the thermal energy present in the form of hot exhaust gases can be transferred in the heat exchanger to a liquid heat transfer medium, in particular water or an oil. The heat transfer medium is provided for heat transport for the purpose of room heating and/or process water heating. The heat exchanger forms a compact unit which is also made of a material of good thermal conductivity. Two separate passages (12, 13) are arranged in the heat exchanger inside a double-walled jacket (10). The jacket has a structured inner space (11) which forms a communicating vessel. Due to the structuring the heat transfer medium flows through at least a predominant part of the inner space.

14 Claims, 2 Drawing Sheets

US 7,641,995 B2

HEAT EXCHANGER FOR A HEATING SYSTEM WITH INTEGRATED FUEL CELLS FOR THE PRODUCTION OF ELECTRICITY

BACKGROUND OF THE INVENTION

The invention relates to a heat exchanger for a heating system with integrated fuel cells for the production of electricity and also to a system with a heat exchanger of this kind.

A heating system with integrated fuel cells for the production of electrical and thermal energy is known from EP-A-0 818 840, wherein the operator of the heating system, the "local energy user", can cover his needs regarding the named forms of energy, at least in part. This heating system includes an additional burner. Various possibilities are described as to how a maximum amount of thermal energy can be given in a heating system which includes room heating and/or process water heating, from the primary energy which is made available in the form of a gaseous fuel. For economic reasons, various measures have been put forward and realized to further simplify the known procedure, wherein one has continued to strive for an ideal utilization of the primary energy. In the method known from EP-A-0 818 840 pure water is needed to reform the fuel. One measure for the simplification of this method was the treatment of the fuel, which can also be present in liquid form, by means of a reformation process with partial oxidation. The partial oxidation renders superfluous the expensive necessity of making available pure water as an additional educt during reforming.

Further measures are a) to arrange a heat store between the system for the production of electrical and also thermal energy and the local energy user and b) if necessary to produce an excess of electrical energy which is given off to a grid of the public electrical energy supply. In the production of an excess of this kind an excess of thermal energy often arises as well which exceeds the current requirement of the local energy user. This thermal energy can be stored temporarily in the heat store. Electrical energy is only produced to excess until the heat store has been fully loaded. An excess of thermal energy can also arise if the local energy user requires a relatively large amount of electrical energy on occasion. A storing of the excess heat is also advantageous in this case.

The transport of heat from the heating system with integrated fuel cells to the heat store has to take place using suitable heat transport mediums. In this arrangement a heat transport is to be carried out to the heat store and/or to the local energy consumer from two exhaust streams, namely from an exhaust stream of the fuel cells and from an exhaust stream of the additional burner. Two independent variables are given by the two exhaust streams, the ranges of which extend respectively between zero and a maximum value. A liquid heat transfer medium, in particular water or an oil, is advantageously provided for the heat transport, with which the heat can be transported to the local energy consumer.

SUMMARY OF THE INVENTION

An object of the present invention is to create means with which a transfer of heat can be carried out economically—in particular with a view to the variability of the exhaust gas streams. In this arrangement an economic transfer of heat for the heat exchanger in accordance with the invention results from a special and compact design.

The heat exchanger is provided for a heating system with integrated fuel cells for the production of electricity and with an additional burner. In this system electrical and thermal energy can be produced from a gaseous fuel or from fuel brought into the gas form by means of the fuel cells and/or by means of the additional burner. One part of the thermal energy present in the form of hot exhaust gases can be transferred in the heat exchanger to a liquid heat transfer medium, in particular water or an oil. The heat transfer medium is provided for a heat transport for the purpose of room heating and/or process water heating (preparation of hot water). The heat exchanger forms a compact unit as well as a unit which is made of material of good thermal conductivity. Two separate passages are arranged in the heat exchanger inside a double-walled jacket. The jacket has a structured inner space which forms a communicating vessel. Due to the structuring the heat transfer medium flows through at least a predominant part of the inner space.

In the following the invention will be explained with reference to the drawings.

DESCRIPTION OF THE PREFERRED EMBODIMENTS

Figure 1:
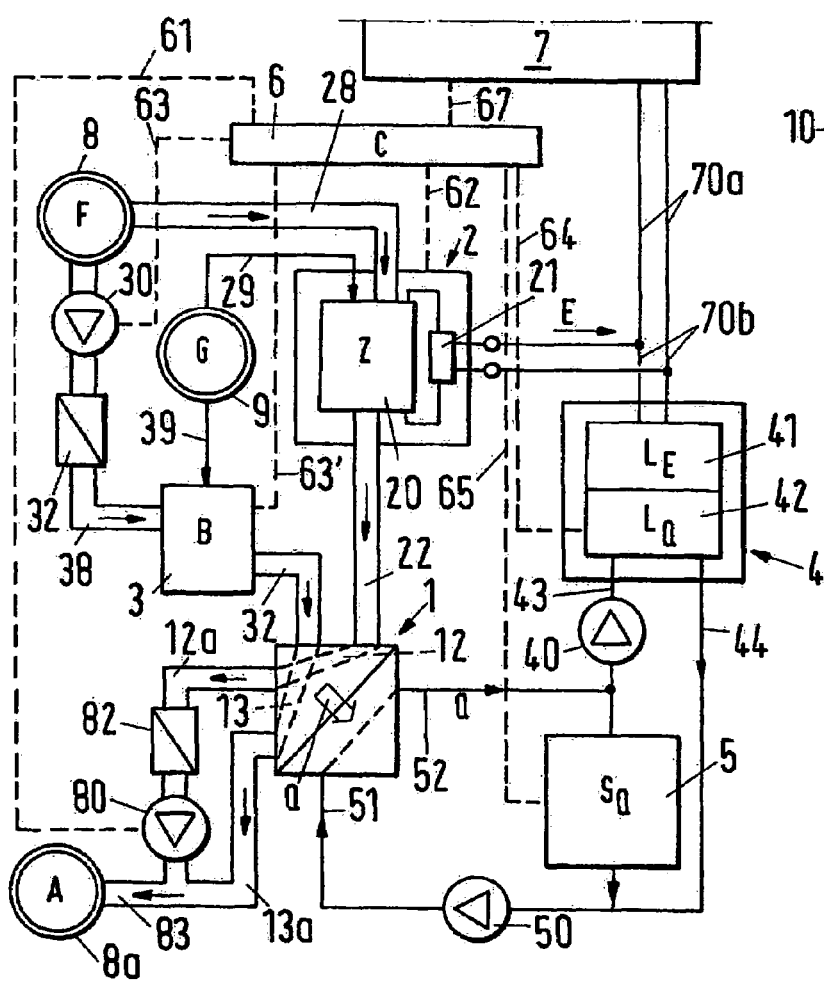
FIG. 1 shows a schematic illustration of a heating system, into which fuel cells for the production of electricity are integrated and which includes an additional burner.

The heating system shown in FIG. 1 includes a heat exchanger 1 in accordance with the invention, a part system 2 with fuel cells Z, which are, for example, arranged in a stack-like unit 20, and an additional burner 3 which is designated with B in FIG. 1. Fresh air is fed from the environment, which is associated with the reference numeral 8, through a duct 28 and gaseous or gasified fuel G is fed from a source 9 through a line 29 to the fuel cells Z (the source 9 can be natural gas which is supplied through a public mains system). Fresh air F is likewise fed through a feed line 38 and fuel G through a feed line 39 to the additional burner 3. Exhaust gases which arise in the part unit 2 and in the additional burner 3 are fed to the heat exchanger 1 via ducts 22 and 32' respectively. By means of the fuel cells Z electrical and thermal energy can be produced from the fuel G and/or thermal energy can be produced by means of the additional burner 3. After burning with exhaust air and the fuel which has not been completely used in the fuel cells Z takes place in the part unit 2.

A DC electrical current given off by the fuel cells Z is transformed in a converter 21 into alternating current. The thus prepared electrical energy E is transported to a local consumer 4 (load $L_E$) or to an outside mains system 7 via the lines 70a or 70b. One part of the thermal energy present in the form of hot exhaust gases is transferred in the heat exchanger 1 to a liquid heat transfer medium, in particular to water or to an oil. The heat transfer medium with which a transport of heat Q is provided for heating purposes is conveyed through the lines 51, 52, 43 and 44 using circulating pumps 40 and 50. In this arrangement this heat Q (line 52) is, on the one hand, completely or partially transported to the local consumer 4 (load $L_Q$); on the other hand, an excess of the heat Q, designated with the reference numeral $S_Q$, can be transported into a heat store 5. Using a suction fan 80 the exhaust gas is conveyed out of the part system 2 (duct 12a) into a duct 83, where it is given off with the exhaust gas of the additional burner 3 (duct 13*a*) united as total gas A into the environment 8*a*. The exhaust gas of the additional burner 3 is transported as a result of an overpressure which is produced with a fan 30. If only the part unit 2 or only the additional burner 3 are operated then non-return flaps 32 and 82 prevent a reverse flow of the exhaust gas.

The heat exchanger 1 in accordance with the invention forms a compact unit which is manufactured from a material of good conductivity. Two separate passages 12 and 13 for the exhaust gas of the fuel cells Z (or more precisely for the exhaust gas from the part system 2) and the exhaust gas of the additional burner are arranged in the heat exchanger inside a double-walled jacket 10. The heat exchanger 1 symbolically shown in FIG. 1 is illustrated in more detail and as a longitudinal section in FIG. 2 for a specific embodiment. The jacket 10 has an inner space 11 structured into chambers and which forms a communicating vessel. Due to the structuring the heat transfer medium flows through the inner space 11 (the whole inner space 11 or at least a predominant part of it) so that heat Q can be fed to it from the two exhaust gas passages 12 and 13. Due to the material of good thermal conductivity of which the jacket 10 is made, the heat transfer medium is able to absorb heat in all regions of the jacket 10, even if one of the two exhaust gas flows fails. The material used is advantageously an aluminum alloy and the jacket 10 is at least partially manufactured by an aluminum casting process.

The system of FIG. 1 is controlled and regulated by a central control unit 6 (also termed C). For example control signals are transmitted via signal lines 61 and 62 to the fans 30 and 80. The part system 2 is connected with the control unit 6 via a signal line 62 and the additional burner 3 is connected with the control unit 6 via a signal line 63'. A connection 67 to the "virtual power station 7" is present. Further connections to the local consumer 4 and to the heat store 5 are established by signal lines 64 and 65 respectively. The pumps 40 and 50 are also connected to the central control unit 6, via non-illustrated lines. By way of example the transport of the heat Q out of the store 5 is regulated advantageously with respect to a predetermined outlet temperature at the heat exchanger 1. The conveying capacity of the pump 50 is varied to effect this regulation.

Figure 2:
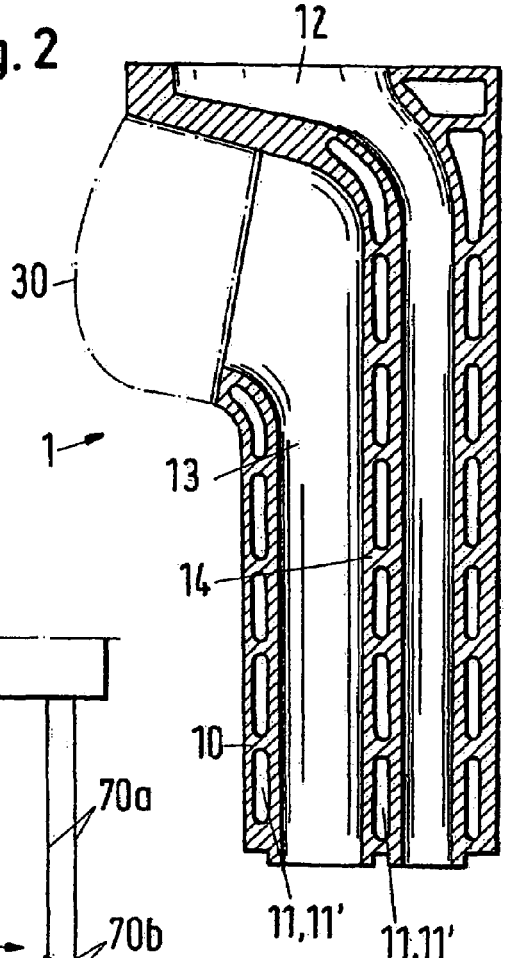
FIG. 2 shows a longitudinal section through a heat exchanger in accordance with the invention.

In the heat exchanger 1 of FIG. 2 a partition wall 14 between the two exhaust gas passages 12 and 13 is made double-walled. The partition wall 14 has a structured inner space of such a kind that the heat transfer medium flows through this as well.

In the embodiment of FIG. 2 the inner space 11 of the jacket 10 is chambered; i.e. it has a structure formed by jacket chambers 11'. In particular the partition wall 14 between the two exhaust passages 12 and 13 is also chambered. (Openings between neighboring chambers 11' are not illustrated.) The chambers 11" of the partition wall 14 are arranged between the jacket chambers 11' in such a manner (in the form of a sequential arrangement) that the transfer medium can likewise flow through the partition wall 14.

The heat exchanger 1 in accordance with the invention is made up of a small number of monolithic parts or preferably comprises one single monolithic part. Each monolithic part is preferably a casting; or at least individual parts are castings.

The two exhaust gas passages 12 and 13 extend from a head end to a foot end of the heat exchanger. The not illustrated inlet point for the heat transfer medium is arranged at the foot end and the corresponding, likewise not illustrated outlet point is arranged at the head end.

The additional burner 3 (indicated by the chain-dotted contour 30) can be arranged directly at the inlet point of the passage 13 provided for the burner exhaust gas in the heat exchanger 1 of FIG. 2. The heat exchanger 1 can advantageously be attached to an exhaust outlet stub of a unit 20 containing the fuel cells Z.

Figure 3:
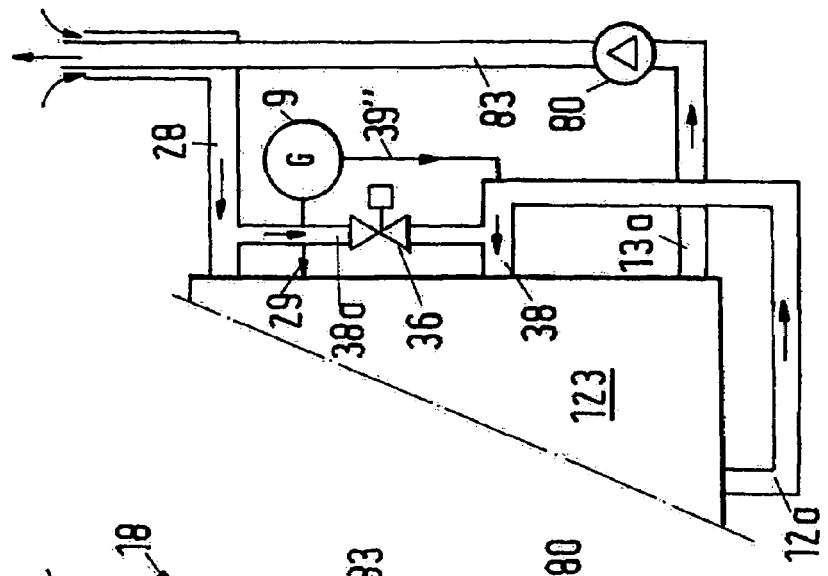
FIG. 3 shows a second illustration of the system shown in FIG. 1.

In a modified illustration, FIG. 3 shows the system of FIG. 1 in slightly modified form. The heat exchanger 1, the part system 2 with the fuel cells Z and the additional burner 3 are amalgamated in a block 123. The fresh air F which has been sucked in out of the environment 8 (see FIG. 1)—illustrated as an arrow F' —is pre-heated in a counter-flow heat exchanger 18 by the exhaust gas A which has been partly cooled in the heat exchanger 1—arrow A'. The pre-heated fresh air F is fed into the block 123 through the lines 28 and 32'. The counter-flow heat exchanger 18 can be designed as a chimney at the same time, through which the exhaust gas is given off to the environment 8*a*.

In distinction to the system in FIG. 1, in FIG. 3 the fuel G is fed from the source 9 via a line 39' into the fan 30, where a combustible mixture arises. This mixture flows through the feed line 38 into the inlet of the burner 3. If the fan 30 is out of operation the non-return flap 32 ensures that exhaust gas which is fed through the fan 80 cannot enter the heat exchanger 1 through the line 13*a*. Vice versa the non-return flap 82 prevents exhaust gas from penetrating into the heat exchanger 1, if the fan 80 is out of action.

Figure 4:
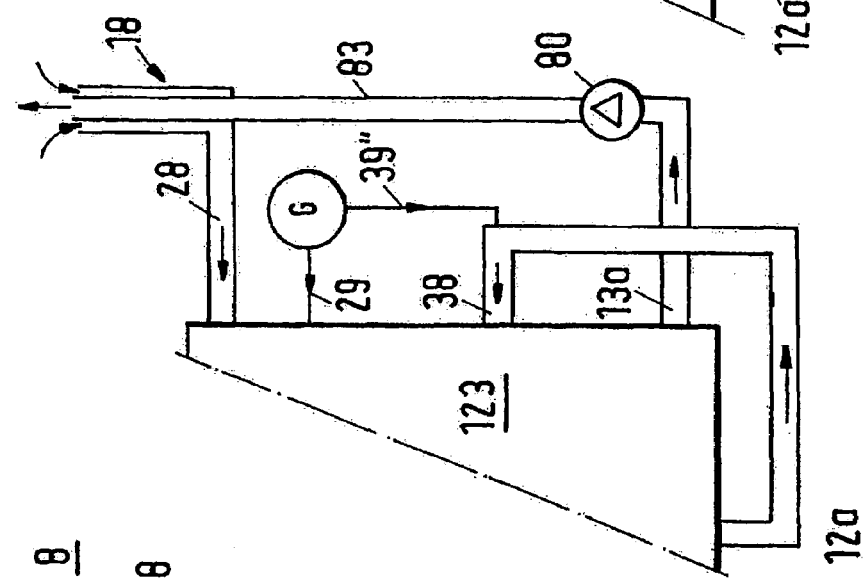
FIG. 4 shows a modified system in an illustration corresponding to FIG. 3.
Figure 5:
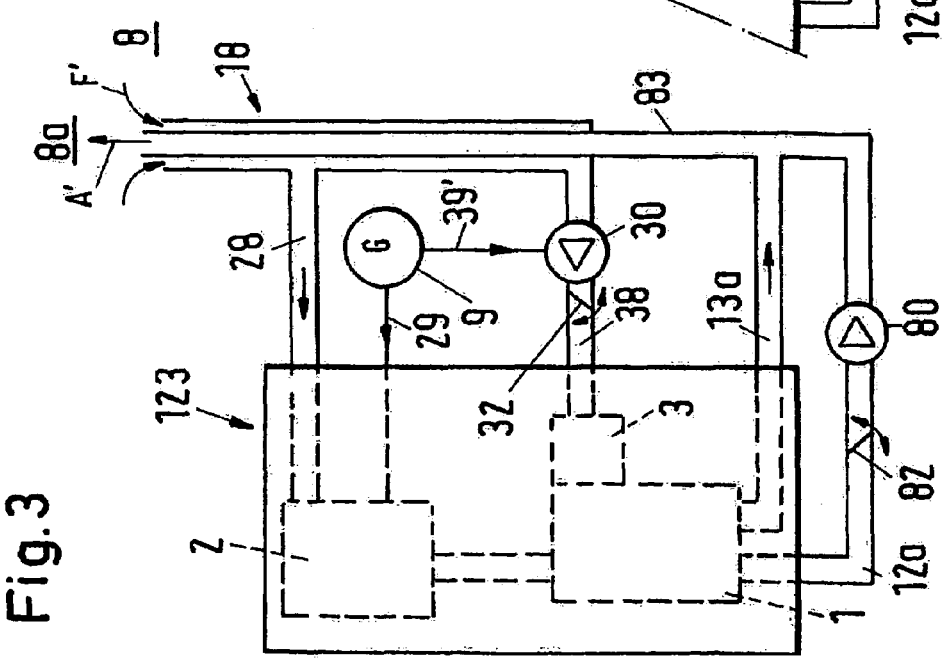
FIG. 5 shows a further modified system.

FIGS. 4 and 5 show two modified embodiments of the heating system with integrated fuel cells. In both modifications the exhaust gas of the fuel cells Z, which contains an excess of oxygen, is fed into the additional burner 3 instead of fresh air. The fan 30 is no longer required. If necessary, fresh air F can be fed into the infeed line 38 of the burner 3 via an additional line 38*a*—see FIG. 5. This feed is controlled by means of a valve 36. The fuel G is respectively mixed into the infeed line 38 using lines 39".

The invention claimed is:

1. A heat exchanger for a heating system with integrated fuel cells (Z) for the production of electricity and with an additional burner (B), wherein electrical and thermal energy (E,Q) can be produced in said heating system from a gaseous fuel or from fuel brought into the gas form by means of the fuel cells and/or thermal energy (Q) can be produced by the additional burner, wherein one part of the thermal energy present in the form of hot exhaust gases can be transferred to a liquid heat transfer medium in the heat exchanger and wherein the heat transfer medium is provided for heat transport for the purpose of room heating and/or process water heating, wherein:
the heat exchanger forms a compact unit which is made of material of good thermal conductivity, such that two separate passages are arranged in the heat exchanger inside a double-walled jacket for conveying the exhaust gas of the fuel cells and the exhaust gas of the additional burner separately from each other through the heat exchanger, and wherein said jacket surrounds the separate passages and has a structured inner space which forms a communicating vessel such that the heat transfer medium flows through at least a predominant part of the inner space.

2. A heat exchanger in accordance with claim 1, wherein a partition wall between the exhaust passages is made double-walled and has a structured inner space to allow the heat transfer medium to flow through the partition wall.

3. A heat exchanger in accordance with claim 2, wherein the inner space of the jacket is chambered, i.e. has a structure formed by jacket chambers, and wherein the partition wall between the exhaust passages is also chambered and chambers of the partition wall are sequentially arranged in the structure of the jacket, so that the heat transfer medium can flow through the partition wall, due to the sequential arrangement of the chambers.

4. A heat exchanger in accordance with claim 1, wherein it consists of or is assembled from a small number of monolithic parts, preferably consists of one single monolithic part and wherein each monolithic part or at least some of the parts are castings.

5. A heat exchanger in accordance with claim 1 wherein said two exhaust passages extend from a head end to a foot end of the heat exchanger and wherein the inlet point for the heat transfer medium is arranged at the foot end and the corresponding outlet point at the head end.

6. A heat exchanger in accordance with claim 1, wherein the additional burner can be arranged directly at the inlet point of the passage provided for the burner exhaust gas and wherein it can be attached to an exhaust gas outlet stub of a unit containing the fuel cells (Z).

7. A heat exchanger in accordance with claim 1, wherein the material used is an aluminum alloy and wherein the jacket is manufactured of cast aluminum, at least in part.

8. A system with a heat exchanger in accordance with claim 1, wherein thermal energy (Q) transported with the heat transfer medium in a circuit can be transported into a heat store, wherein this heat transport is regulated at the heat exchanger with relation to a predetermined outlet temperature and wherein the heat store is connected via a further circuit to a heating system for room heating and/or process water heating ($L_q$) for the purpose of heat transport.

9. A system in accordance with claim 8, wherein separate ducts are connected to the two exhaust gas passages at the outlet of the heat exchanger, wherein a non-return flap and a suction fan are arranged in the duct for the exhaust stream of the fuel cells (Z), wherein fresh air (F), in particular preheated fresh air, can be fed with a pressure fan and via a non-return flap into the additional burner and wherein prior to or on entering a chimney the ducts for the two exhaust streams are combined into a common duct.

10. A system in accordance with claim 8, wherein at the outlet of the heat exchanger a duct for the flow of the fuel cell exhaust gas leads without branching to the inlet duct of the additional burner, wherein a duct for the stream of the additional burner exhaust leads via a suction fan into a chimney and wherein an additional duct for fresh air (F) can be attached to the infeed duct of the additional burner.

11. A system with integrated fuel cells (Z) for the production of electricity, with an additional burner (B) and with a heat exchanger in accordance with claim 1, wherein electrical and thermal energy (E,Q) can be produced in said system from a gaseous fuel or from fuel brought into the gas form by means of the fuel cell and/or thermal energy (Q) can be produced by means of the additional burner, wherein one part of the thermal energy present in the form of hot exhaust gases can be transferred to a liquid heat transfer medium, in particular water or oil, in the heat exchanger and wherein the heat transfer medium is provided for heat transport for the purpose of room heating and/or process water heating.

12. A heat exchanger in accordance with claim 1, wherein said liquid heat transfer medium is water or oil.

13. A heat exchanger in accordance with claim 1, wherein the double-walled jacket includes jacket chambers for flowing the heat transfer medium in a transverse direction to the flow of the exhaust gas of the fuel cells and the exhaust gas of the additional burner, when viewed in cross-section.

14. A heat exchanger in accordance with claim 13, wherein the double-walled jacket includes a partition wall which is between the two separate passages, the partition wall including at least some of the jacket chambers.

\* \* \* \* \*